Figures 1, 2:
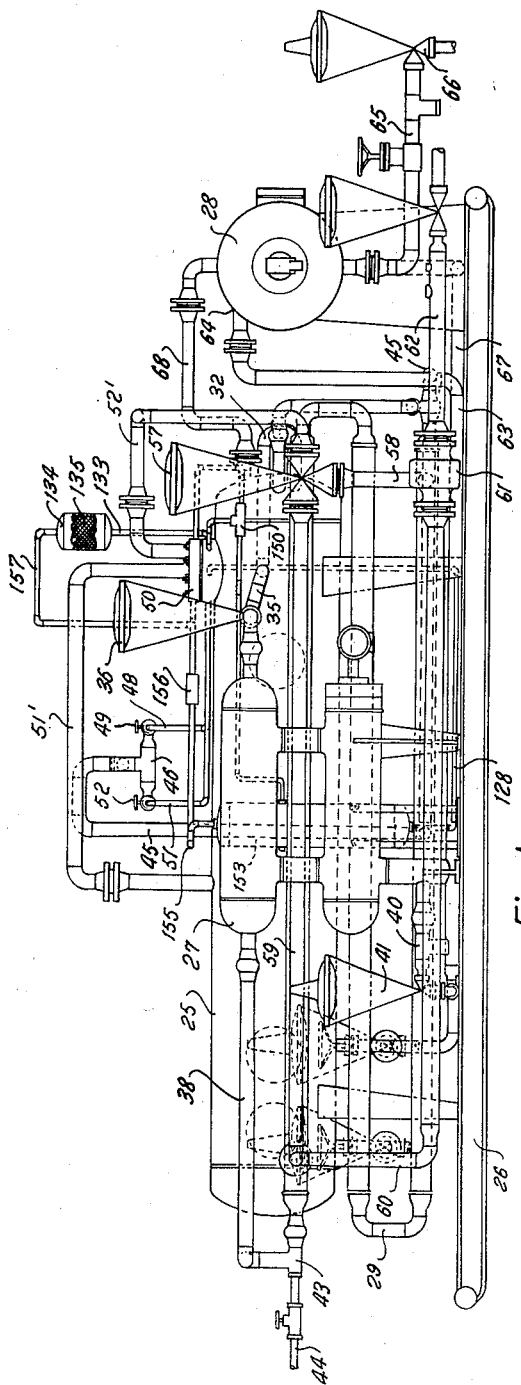

May 24, 1960 J. S. SWEARINGEN ET AL 2,937,503
TURBO-EXPANDER-COMPRESSOR UNITS
Filed Sept. 19, 1955 11 Sheets-Sheet 1

INVENTORS
Judson S. Swearingen
David J. Cozad
BY Ashley & Ashley
ATTORNEYS

May 24, 1960 J. S. SWEARINGEN ET AL 2,937,503
TURBO-EXPANDER-COMPRESSOR UNITS
Filed Sept. 19, 1955 11 Sheets-Sheet 3

INVENTORS
Judson S. Swearingen
David J. Cozad
BY *Ashley & Ashley*
ATTORNEYS

INVENTORS
Judson S. Swearingen
David J. Cozdd
BY

ATTORNEYS

INVENTORS
Judson S. Swearingen
David J. Cozad

BY

ATTORNEYS

INVENTORS
Judson S. Swearingen
David J. Cozad
BY

ATTORNEYS

United States Patent Office 2,937,503
Patented May 24, 1960

2,937,503

TURBO-EXPANDER-COMPRESSOR UNITS

Judson S. Swearingen, San Antonio, Tex., and David J. Cozad, Fort Worth, Tex., assignors to National Tank Company, Tulsa, Okla., a corporation of Nevada Filed Sept. 19, 1955, Ser. No. 535,089

12 Claims. (Cl. 62—16)

This invention relates to new and useful improvements in turbo-expander-compressor units.

The invention is particularly concerned with turbo-expander-compressor units adapted for utilization in a low temperature separation system for the recovery of valuable liquefiable constituents from petroleum well streams. Accordingly, the invention also relates to new and useful improvements in low temperature separation systems for high-pressure, predominantly gaseous, petroleum well streams.

In the petroleum industry, it has become the practice to carry out the separation of the gaseous and liquid constituents of petroleum well streams under low temperature in those cases in which the well stream is predominantly gaseous in nature, and contains appreciable quantities of the lighter or more volatile hydrocarbons. These latter hydrocarbons are in demand for utilization in motor fuels, but their recovery from large volumes of high pressure gas by conventional separation methods has not always been as efficient as might be desired. Effective and relatively complete separation and recovery of the light hydrocarbons has been obtained in the more elaborate type of absorption recovery systems, commonly known as "gasoline plants," but such installations are too expensive for utilization with a single well or a small group of wells. Therefore, it has been the practice to conduct the high pressure well stream through a low temperature separation unit in which the well stream undergoes a marked pressure reduction or expansion, and consequently, is reduced quite markedly in temperature. This chilling of the well stream results in the condensation of the lighter hydrocarbons which then may be separated and recovered as liquids.

Low temperature separation systems depend, however, upon the passing of the well stream through a quite large pressure reduction, and there are limiting factors as to the pressure drop which may be tolerated. In most cases, the denuded gas leaving the low temperature unit must be under sufficient pressure to enter a gas transmission pipe line at a pressure of 800 to 1200 pounds per square inch, and yet, the entrant pressure of the well stream is limited by that available from the well being produced. Many wells of this type originally flow at pressures of two to three thousand pounds per square inch or more, but as the petroleum formation is relieved of its hydrocarbon constituents, the formation pressure, and hence, the well flowing pressure, tends to decrease. Further, there are many marginal wells which are not capable of flowing at pressures much in excess of fourteen to fifteen hundred pounds per square inch, and it has not been possible to obtain economic liquid recoveries from such well streams by passing the well stream through a pressure drop of six or seven hundred pounds per square inch.

The present invention is directed toward the solution of these problems, permitting a larger pressure drop in the well stream for adequate chilling or cooling thereof, followed by a boosting of the pressure of the effluent gas to a level adequate to permit its entry into a gas transmission pipe line. It is, therefore, one object of this invention to provide an improved low temperature separation system having therein a unique turbo-expander-compressor unit through which the well stream is expanded to effect enhanced cooling thereof, and by means of which, the pressure of the effluent, separated gas may be increased.

An important object of the invention is to provide an improved turbo-expander-compressor particularly adapted for use in a low temperature separation system, having a novel lubrication system in which the loss of lubricant into the flowing well stream is substantially eliminated.

A particular object of the invention is to provide an improved turbo-expander-compressor particularly adapted for operation in a high pressure hydrocarbon atmosphere, in which the necessity for turbine shaft seals is eliminated, and in which gas flow under pressure is employed for the flowing of a lubricant oil and for the containing of said oil within the desired zones.

Yet another object of the invention is to provide an improved turbo-expander-compressor unit particularly adapted for utilization in a low temperature separation system in which provision is made for the supplying of lubricating oil to the expander-compressor shaft, for withdrawal of such oil and separation of gas therefrom, and for return of such oil to the shaft in a continuous lubrication cycle.

A construction designed to carry out the invention will be hereinafter described, together with other features of the invention.

Figure 3:
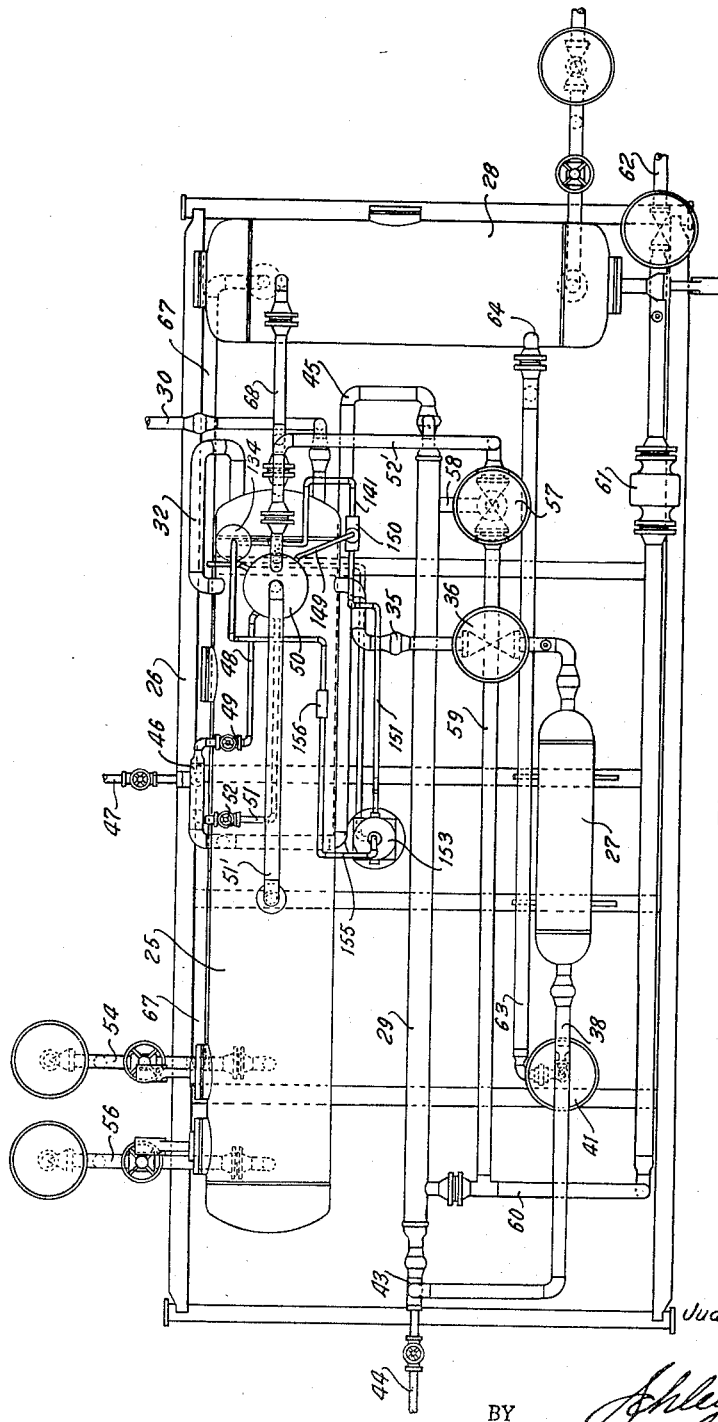
Figure 4:
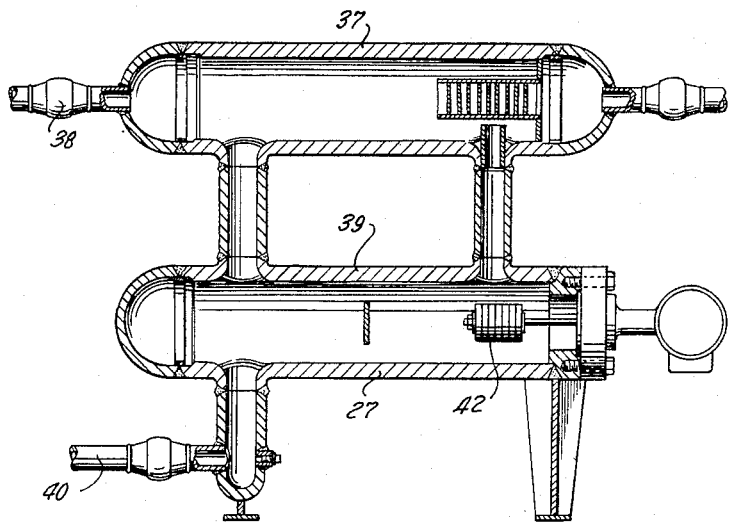
Figure 5:
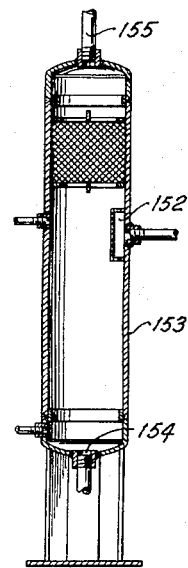
Figure 6:
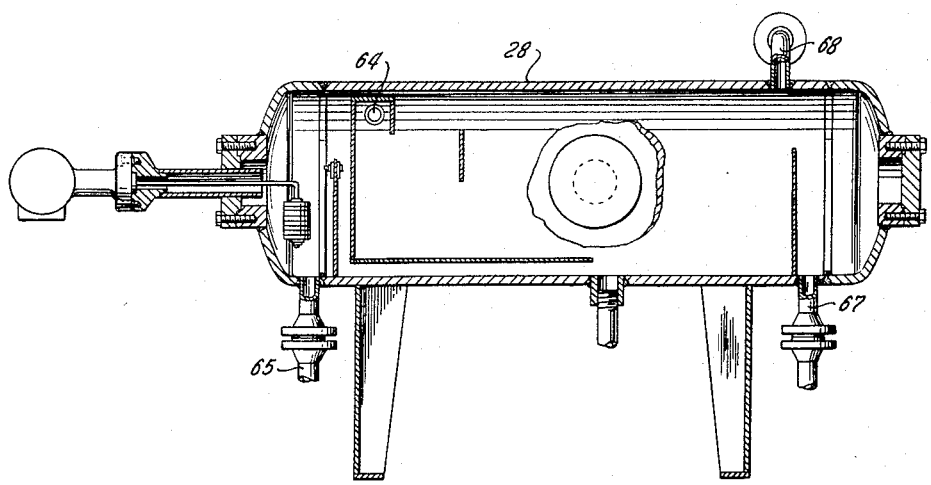
Figure 7:
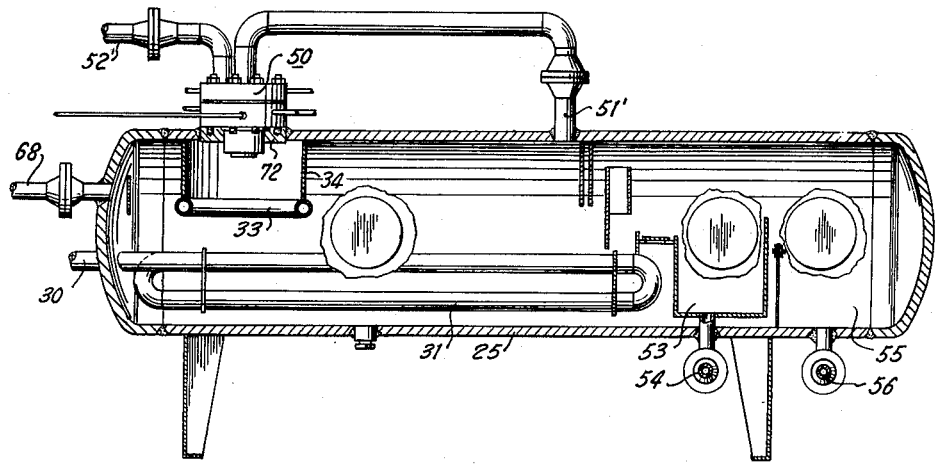
Figure 8:
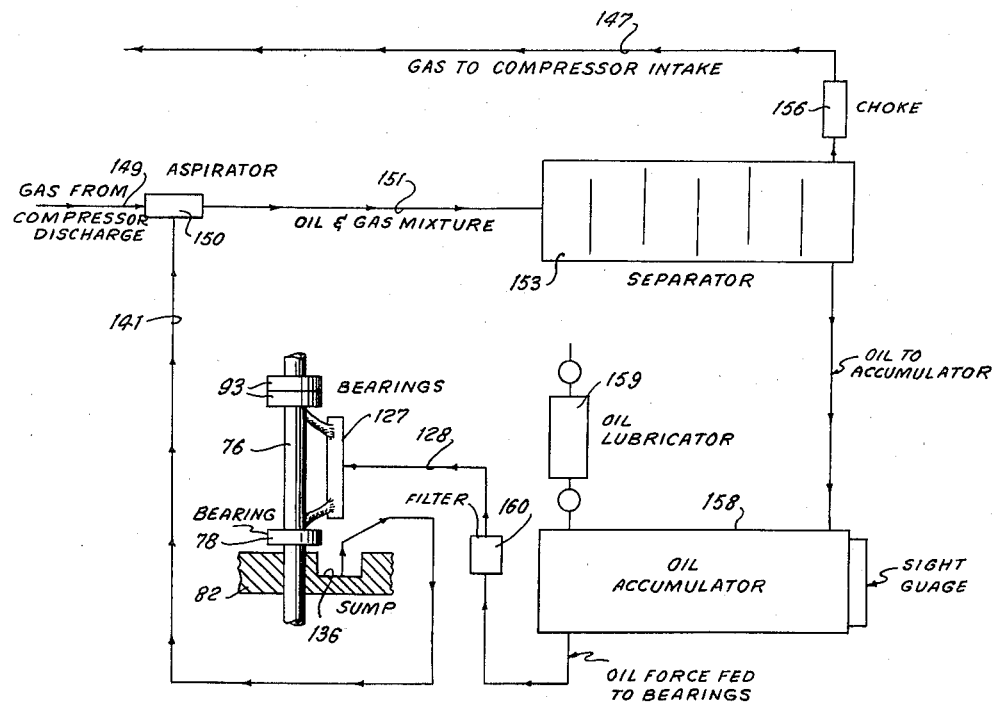
Figure 9:
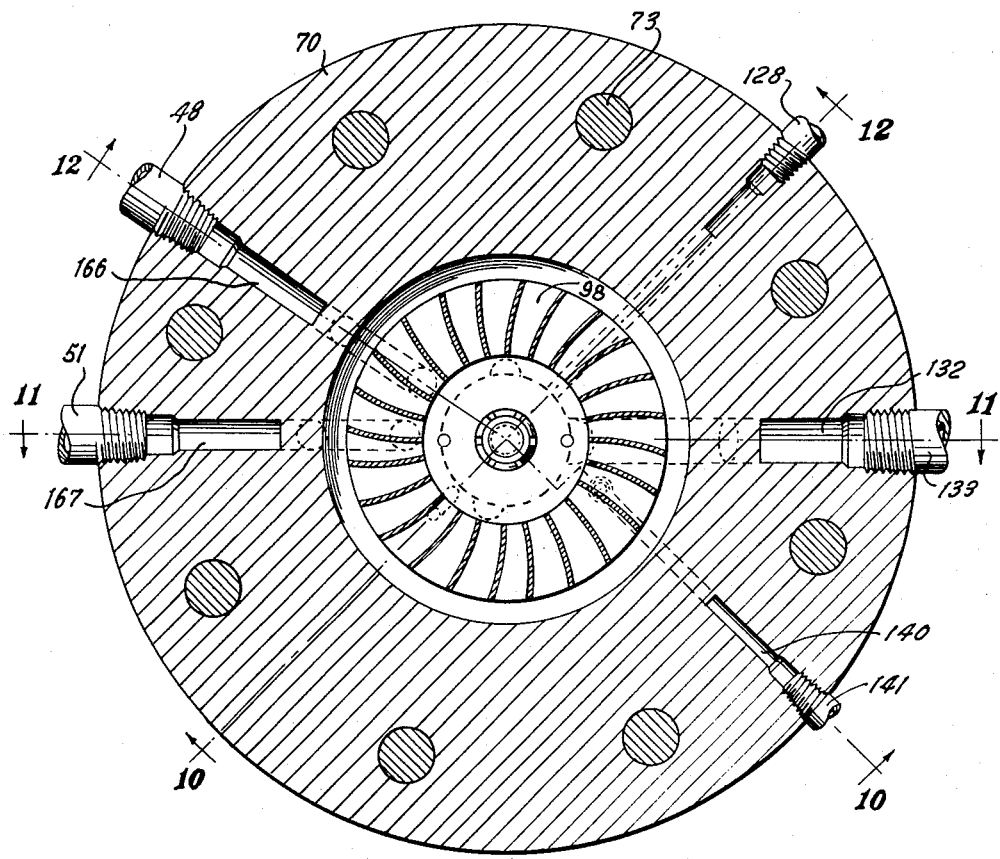
Figure 13:
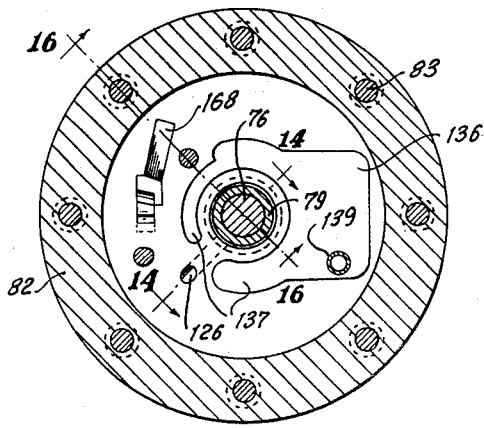
Figure 10:
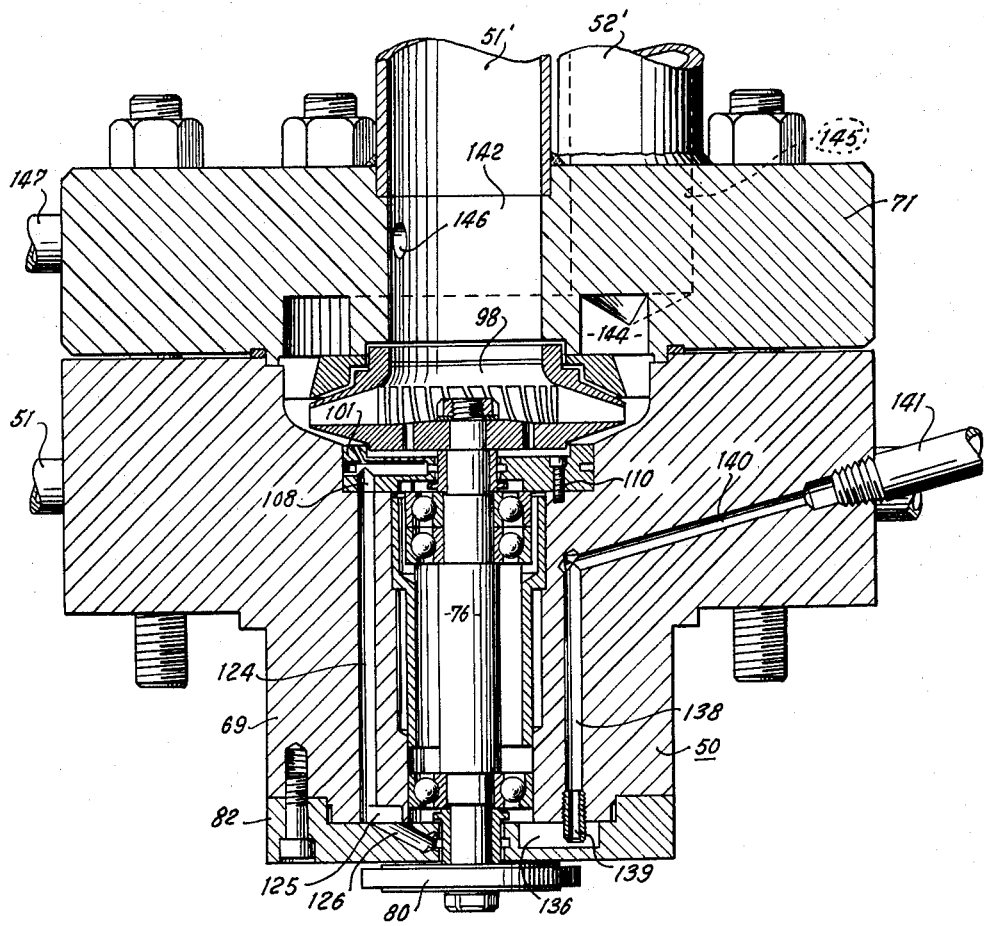
Figure 11:
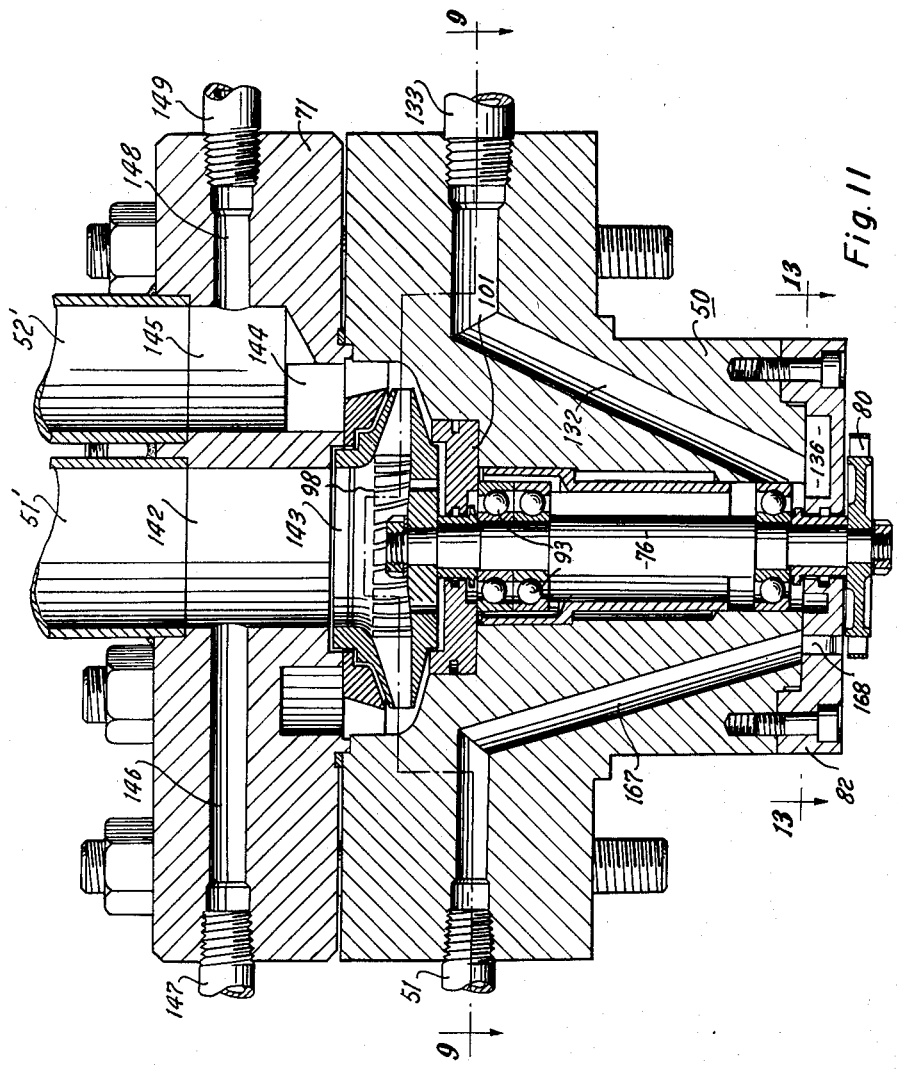
Figure 12:
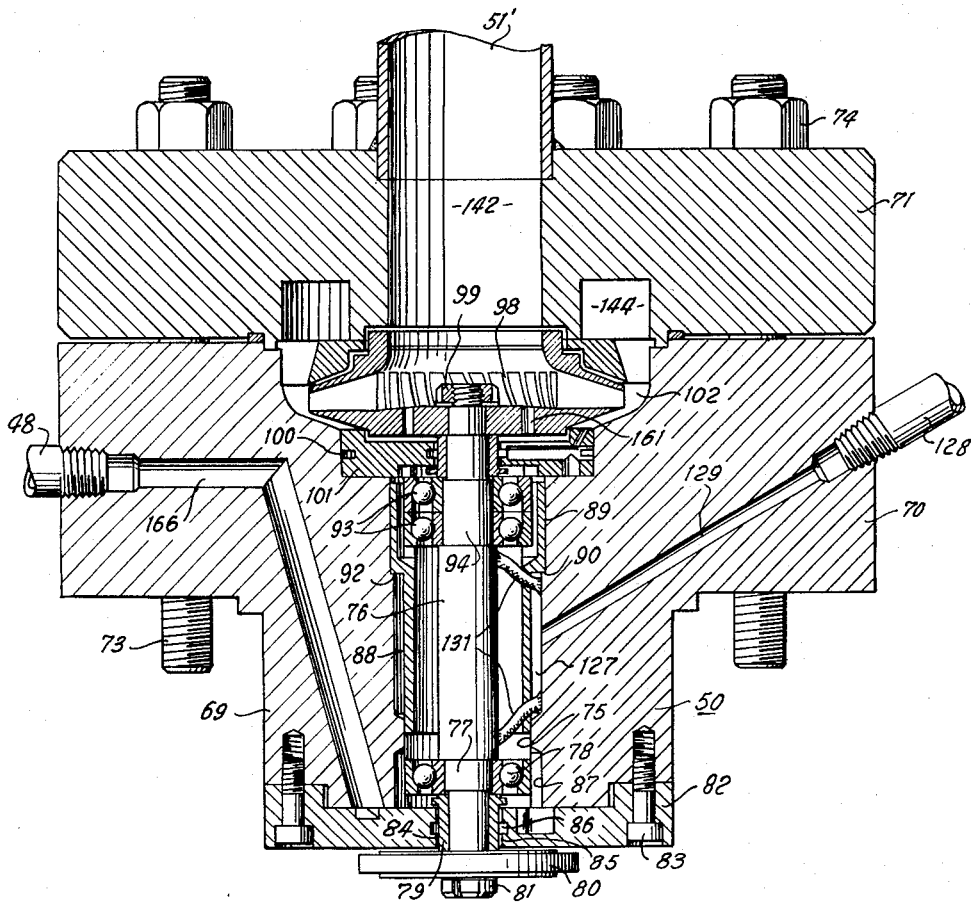
Figure 14:
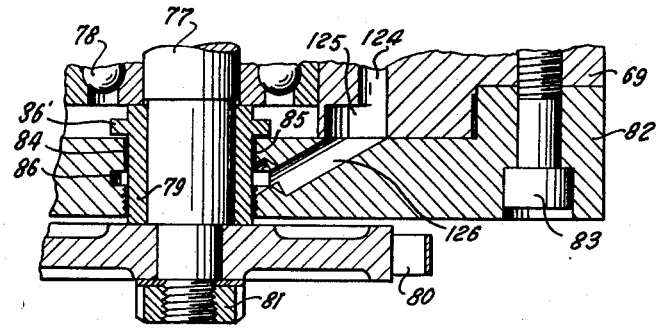
Figure 15:
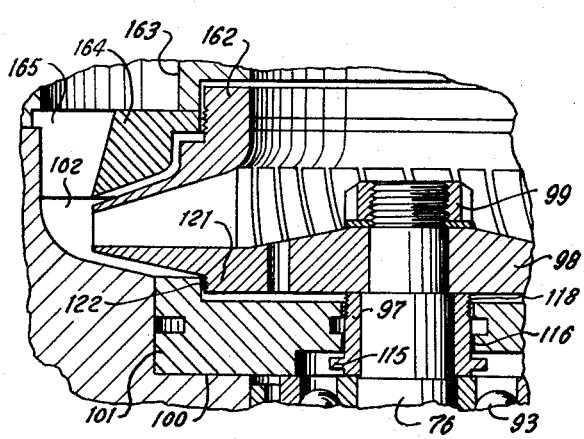
Figure 17:
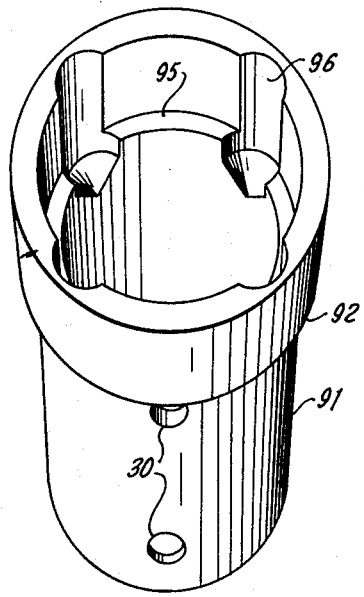
Figure 16:
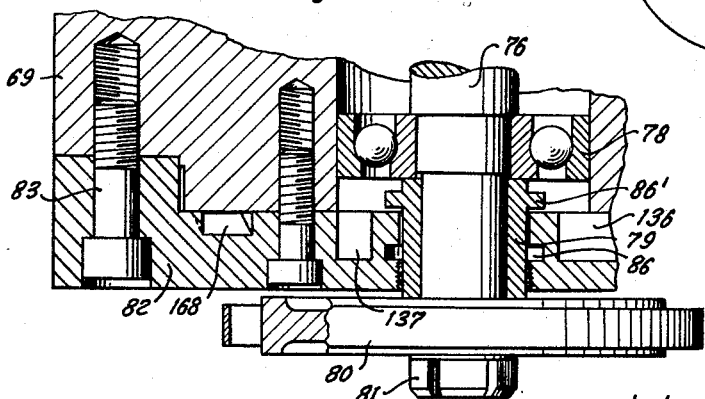
Figure 18:
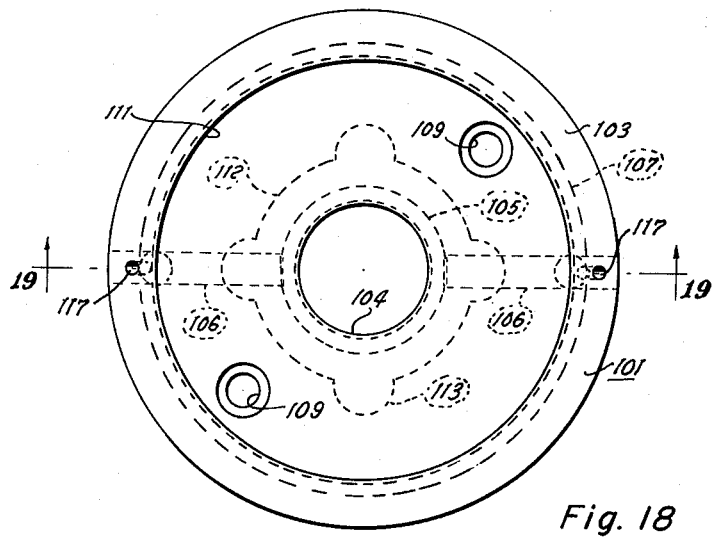
Figure 19:
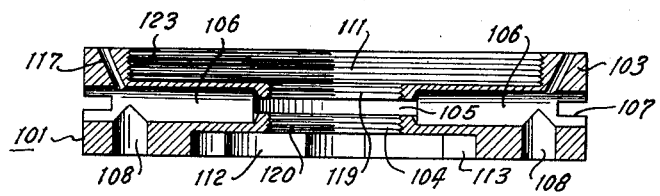
Figure 20:
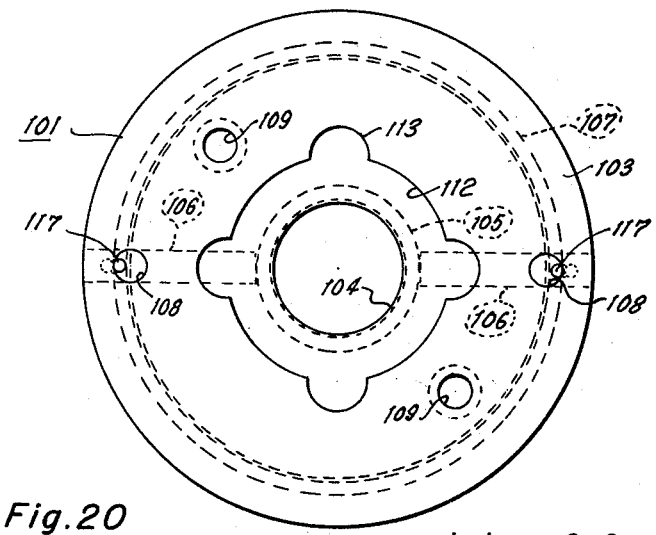
Figures 21, 22:
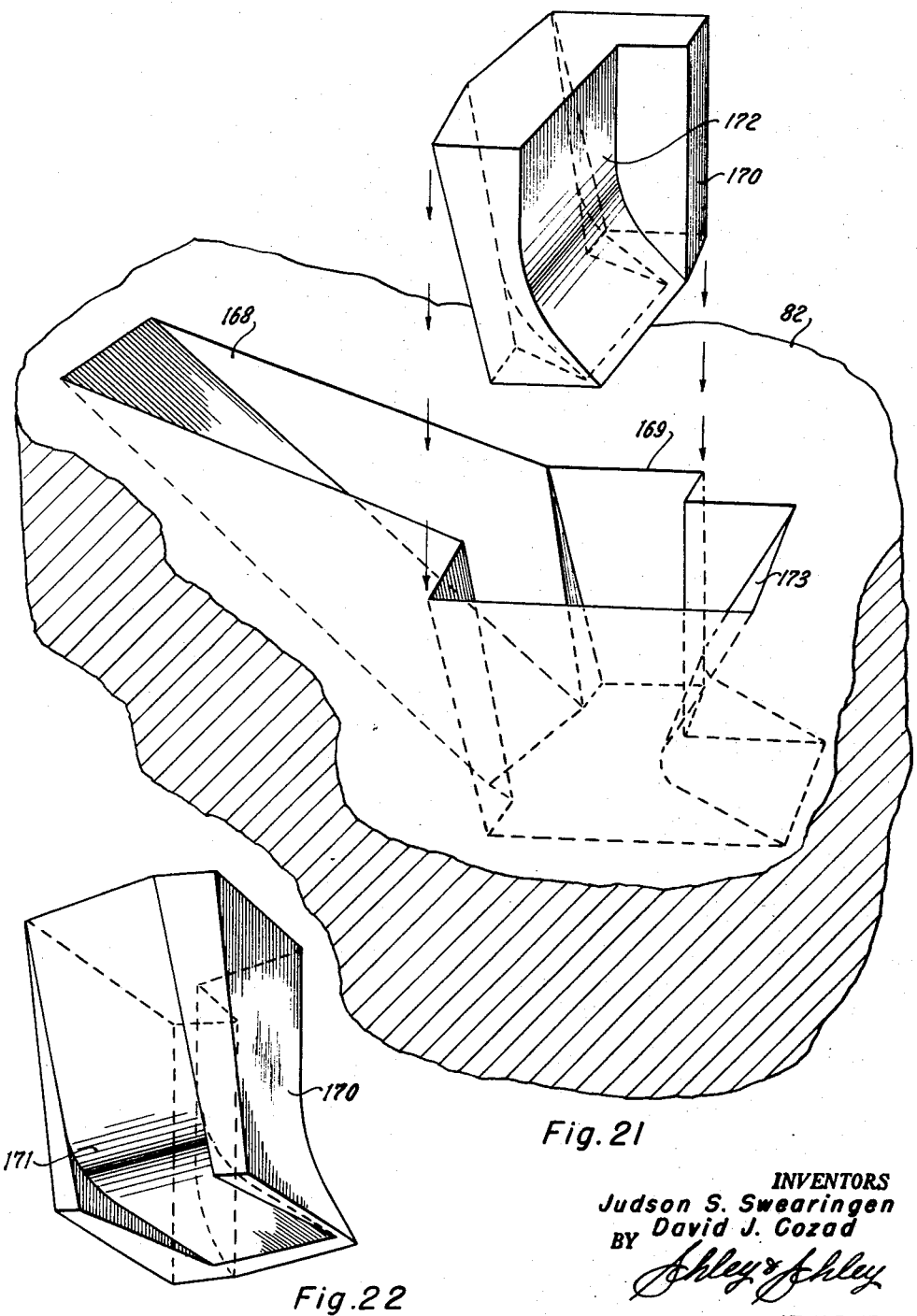

The invention will be more readily understood from a reading of the following specification and by reference to the accompanying drawings, wherein examples of the invention are shown, and wherein:

Fig. 1 is a side elevational view of a low temperature separation unit constructed in accordance with this invention and adapted to carry out the teachings thereof, the unit including the turbo-expander-compressor structure disclosed by this invention, Fig. 2 is an end elevation of the low temperature separation unit, Fig. 3 is a plan view of the low temperature separation unit, Fig. 4 is a vertical, sectional view of the high pressure separator of the low temperature unit, Fig. 5 is a vertical, sectional view of the gas and lubricating oil separator, Fig. 6 is a vertical, sectional view of the gas, oil and water separator for the low temperature unit, Fig. 7 is a vertical, longitudinal, sectional view of the low temperature separation vessel, Fig. 8 is a diagrammatic view showing the lubricating oil flow system, Fig. 9 is an enlarged, horizontal, cross-sectional view of the turbo-expander-compressor unit showing the compressor rotor and certain of the fluid conductors, the view being taken on line 9—9 of Fig. 12, Fig. 10 is a vertical, cross-sectional view taken upon the line 10—10 of Fig. 9, Fig. 11 is a vertical, sectional view taken upon the line 11—11 of Fig. 9, Fig. 12 is a vertical, sectional view taken upon the line 12—12 of Fig. 9, Fig. 13 is a horizontal, cross-sectional view taken upon the line 13—13 of Fig. 11, Fig. 14 is an enlarged, fragmentary, vertical, sectional view taken upon the line 14—14 of Fig. 13, Fig. 15 is an enlarged, fragmentary, vertical, sectional view of the upper portion of the expander-compressor shaft showing the labyrinth seals, Fig 16 is an enlarged, fragmentary, vertical, sectional view taken upon the line 16—16 of Fig. 13, Fig. 17 is an isometric view of the sleeve for supporting the upper shaft bearings, Fig. 18 is a plan view of the lubricant sealing disk for the upper end of the expander-compressor shaft, Fig. 19 is a vertical, sectional view taken upon the line 19—19 of Fig. 18, Fig. 20 is a view in elevation of the under side of the seal disk of Fig. 18, Fig. 21 is an enlarged view in perspective of the nozzle structure, and Fig. 22 is a view in perspective taken from the rearward side of the nozzle insert block.

The structures and methods disclosed in this application are broadly disclosed in the co-pending application of Joseph L. Maher, Serial No. 451,195, filed August 20, 1954, now abandoned, of which Patent No. 2,873,814 is a continuation-in-part and reference is made thereto.

In Fig. 1 of the drawings, there is shown the component elements of a low temperature separation unit, the numeral 25 designating therein a low temperature separation vessel mounted upon a unitary skid-type base 26 along with a high pressure separator 27, a water, oil and gas separator 28, and a heat exchanger 29. The high pressure well stream is admitted through a pipe 30 to a heating coil 31 (Fig. 7) in the lower portion of the vessel 25, from which coil the well stream flows via a pipe 32 through a heating coil 33 carried upon the lower end of a centrifugal separator drum 34 provided in the upper portion of the vessel 25. Heat is thus imparted from the well stream to the coil 31 and the lower portion of the vessel 25, and to the coil 33 and the spinner drum 34.

The well stream leaves the coil 33 through an outlet pipe 35 and passes through a flow-regulating, diaphragm-operated valve 36 into the high pressure separator 27. The structure of the separator 27 is illustrated in Fig. 4 and includes an upper vessel 37 within which the well stream is resolved into liquid and gaseous components, the gaseous portion leaving through the outlet pipe 38, and the separated liquid collecting in the lower vessel 39 for withdrawal through the outlet pipe 40. A diaphragm-operated valve 41, controlled by a float 42 within the lower vessel 39 regulates the withdrawal of liquid from the high pressure separator.

The gas outlet pipe 38, as shown in Figs. 1 and 3, is connected through a T 43 to one flow path of the heat exchanger 29. A desiccant or hydrate inhibitor inlet pipe 44 is also connected into the T 43 for admitting a suitable hydrate inhibitor, such as diethylene glycol, triethylene glycol, or other well known desiccants for depressing the water vapor dew point of natural gas streams, for commingled flow with the gas stream through the heat exchanger. Natural gas streams under high pressure exhibit the property of forming gas hydrates at relatively high temperatures, and since the gas stream is to be cooled in the heat exchanger 29, it is important that the hydrate formation temperature point of the gas stream be lowered prior to passage of the gas stream through the heat exchanger. An inhibitor may be injected into the gas stream through the pipe 44 for this purpose immediately prior to entry of the gas stream into the heat exchanger, and inhibitors may be injected at later points in the system, in addition to that added through the pipe 44, or in lieu thereof, as will appear more fully hereinafter.

Within the heat exchanger 29, the gas stream is passed in heat exchange with the cold effluent gas from the low temperature separator 25, after which the chilled gas stream is conducted from the heat exchanger through a pipe 45 to a header 46. A second inhibitor injection pipe 47 is connected into the pipe 45 immediately in advance of the header 46 for additional injection of inhibitor, if such is desirable. A first gas stream flow pipe 48 leads from the header 46 through a valve 49 to the turbo-expander-compressor unit 50, and a second gas stream flow pipe 51 also leads from the header 46 through a valve 52 to the unit 50. As shown in Fig. 7, the expander-compressor unit 50 is mounted in the upper portion of the low temperature separation vessel 25 in axial alinement with the centrifugal separator drum 34, the lower portion of the unit projecting downwardly in the vessel 25 and within the drum 34.

The expander-compressor unit 50 is described in greater detail hereinafter, it being pointed out at this juncture that the unit receives a high pressure gas stream from the conductor 45 and employs the gas stream to drive a turbine wheel whereby the gas stream undergoes pressure reduction while doing work. Thus, a cooling effect greater than that normally attributable to the Joule-Thompson effect is obtained, and a very cold gas stream is exhausted into the interior of the low temperature separation vessel 25 through the open bottom of the spinner drum 34. The pressure drop and quite considerable chilling of the gaseous well stream results in the condensation of light hydrocarbons therefrom, along with the condensation of water or the formation of gas hydrates. Thus, the gas stream is substantially denuded of liquefiable hydrocarbons, and its water vapor content is reduced to a very low point. The effluent gas is removed from the low temperature vessel 25 through a gas outlet conductor 51' leading to the suction side of a compressor rotor within the unit 50 driven by the turbine. The pressure of the effluent gas is thus increased, and the gas is flowed from the unit 50 through the outlet pipe 52'.

Within the low temperature vessel 25, the well stream separates and stratifies into a gaseous layer, a liquid hydrocarbon layer, and an aqueous layer. As pointed out hereinbefore, gas hydrates may be formed during the expansion of the gaseous stream, and the heating coil 31 is provided for melting of these hydrates. The separated liquid hydrocarbons spill into a sump 53 within the vessel 25 for withdrawal through an outlet pipe 54, and the separated aqueous material collects in a sump 55 for withdrawal through an outlet pipe 56.

The high pressure gas stream entering the expander-compressor unit 50 may be at a pressure from above one thousand pounds per square inch to a pressure of several thousand pounds per square inch. Likewise, the effluent gas drawn off through the outlet pipe 52' must be at a sufficiently elevated pressure as to permit its flow into a gas transmission pipeline, gasoline plant, or other point of use. The difference in these two pressures is the degree of expansion which may be utilized in the conventional low temperature separation unit.

In the present structure, not only is a greater pressure drop or degree of expansion achieved, but the gas stream is caused to do work while so expanding, and hence, the chilling of the well stream is doubly enhanced.

Assuming as a specific example, a well stream inlet pressure of fifteen hundred pounds per square inch gauge and an outlet pressure of eight hundred pounds per square inch gauge, an internal pressure of six hundred pounds per square inch gauge may be maintained within the vessel 25, thus providing a nine hundred pound per square inch pressure drop for chilling of the well stream. The energy extracted from the well stream by the turbine, with consequent cooling of the stream, is employed for driving the compressor rotor and raising the pressure of the effluent gas flowing through the pipe 51' at six hundred pounds per square inch gauge to a level of eight hundred pounds per square inch gauge for release through the outlet pipe 52'. Obviously, the doing of work by the well stream and the greater pressure reduction thereof, provides considerably increased chilling or cooling of the stream and correspondingly increased recoveries of valuable liquid hydrocarbons thereof along with more complete dehydration or drying of the effluent gas.

The cold gas stream leaving the low temperature separation unit through the outlet pipe 52' is conducted through said pipe to a three-way valve 57 having one outlet 58 connected to the heat exchanger 29, and one outlet connected to a by-pass 59 connected into the gas outlet pipe 60 leading from the opposite end of the heat exchanger. The pipe 60 extends through a gas flow metering device 61 and on to a gas discharge conductor 62 for use or disposal. It is desirable that the gas stream enter the turbine unit 50 at a temperature just above its point of gas hydrate formation, and the three-way valve 57 is desirably thermostatically controlled to regulate the quantity of cold gas flowing through the heat exchanger 29, and thus to maintain the temperature of the gas stream being passed through the heat exchanger at a level at which the desired conditions of entry of the gas stream into the turbine unit are maintained.

The separated liquids withdrawn from the high pressure separator 27 through the outlet pipe 40 are conducted from the valve 41 through the pipe 63 to the inlet 64 of the water-hydrocarbon-gas separator 28, shown in Fig. 6. Within the vessel 28, this stream of fluids is resolved into a lower water stratum which is withdrawn through the water outlet 65 through a water outlet valve 66, an intermediate hydrocarbon layer which is skimmed off the water stratum and withdrawn through an outlet pipe 67 connected into the hydrocarbon outlet 54 from the low temperature separation unit 25, and an upper gas layer withdrawn through a gas outlet conductor 68 which is connected into the inlet end of the low temperature vessel 25, as shown in Fig. 7. The liquids separated in the high pressure separator 37, and especially the aqueous portion thereof, may contain dissolved salts, or other material which would interfere with the proper operation of the expander-compressor, or which would interfere with the subsequent recovery of inhibitor from the aqueous liquid withdrawn from the low temperature separator through the outlet pipe 56. Accordingly, it is preferable that this aqueous portion from the high pressure separator be separately withdrawn through the outlet conductor 65.

As shown in Figs. 7 and 12 of the drawings, the expander-compressor unit 50 includes a cylindrical body 69 having at its upper end a relatively thick or heavy annular flange 70. A relatively thick or heavy head or top plate 71 is received on the body above the flange 70, the structure being received upon a mounting flange 72 provided in the upper wall of the low temperature separation vessel 25 and alined with the spinner drum 34. Screw-threaded studs 73 extend from the flange 72 upwardly through the flange 70 and the head 71, and receive nuts 74 on their upper ends for clamping the head and body portions of the expander unit to the flange 72 and to the vessel 25 with the lower portion of the body 69 extending downwardly into the vessel within the drum 34.

The bearing body 69 is formed with an axial bore 75 in which the shaft 76 of the expander-compressor unit is positioned. A bearing face 77 near the lower end of the shaft 76 is received in a suitable anti-friction bearing, such as the ball bearing 78, the outer periphery of the bearing engaging the wall of the bore 75. A clamping collar 79 is provided upon the shaft below the bearing 78, and spaces from the bearing a turbine wheel or rotor 80 secured upon the lower extremity of the shaft 76 by the nut 81. The turbine wheel may be of any suitable or desirable structure, but desirably is of the impulse or Rateau type.

A closure plate 82 is secured upon the lower end of the body 50 by bolts 83 and is provided with a central opening 84 through which the spacer sleeve 79 extends. A narrow annulus or gas flow space 85 is provided between the wall of the bore 84 and the outer surface of the sleeve 79, and an annular groove 86 is formed in the wall of the bore 84 intermediate the upper and lower ends of the annulus 85. Further, the sleeve 79 is provided with an outwardly extending annular flange 86' (Fig. 16) on its upper end between the upper surface of the plate 82 and the bearing 78, and a plurality of semi-circular grooves 87 are provided in the lower portion of the bore 75 and extend from the aforementioned space to a point above the bearing 78. Thus, as will appear more fully hereinafter, the flange 86' may function as a gas pump to draw oil-laden gas through the bearing 78 and deliver the same through the grooves 87 into the bore 75 above the bearing 78.

The bore 75 is enlarged upwardly from a point spaced above the upper ends of the grooves 87 to form a counterbore 88, and further enlarged near its upper end to form a second counterbore 89 and a shoulder 90 between the counterbores 88 and 89. A bearing supporting sleeve 91, shown in detail in Fig. 17, extends axially within the counterbore 88, the lower end of the sleeve being received in the bore 75 and terminating above the upper ends of the grooves 87. The upper portion of the sleeve 91 is provided with an external shoulder 92 seating upon the shoulder 90 for supporting of the sleeve in proper position, and bearings 93 fit snugly on a bearing face 94 provided on the upper end of the shaft 76 and engage an internal shoulder 95 provided in the upper end of the sleeve 91. Semi-circular grooves 96, similar to the grooves 87, extend axially of the inner wall of the sleeve from the upper end thereof to a point below the shoulder 95 whereby gas may flow downwardly around the outer peripheries of the bearings 93.

Above the bearing face 94, the shaft 76 is reduced to receive a spacer sleeve 97, above which a compressor rotor 98 is clamped onto the shaft by a nut 99. The compressor rotor may be of any suitable or desirable type, preferably being of the centrifugal or turbine type.

The bore 75 is still further enlarged above the counterbore 89 to form a relatively wide shoulder 100 receiving a gas sealing ring 101. Above the shoulder 100, the bore flares out into a compressor chamber 102 within which the compressor rotor 98 revolves.

The gas seal ring 101 is illustrated in detail in Figs. 18 through 20 and comprises essentially a circular disk-like plate 103 having an axial bore 104 through which the spacer sleeve 98 extends. An annular groove 105 is cut in the face of the bore 104 intermediate its upper and lower ends and opens into a pair of diametrically opposed, radial passages 106 extending from the groove 105 to the outer margin of the plate 103 and opening at that point into an annular groove 107 formed in the outer periphery of the plate 103. Axial bores 108 extend from the outer ends of the bores 106 through the bottom of the plate 103, and diametrically opposed bolt openings 109 are provided for the reception of securing bolts 110. A wide flat circular recess 111 is provided in the upper surface of the plate 103 in axial alinement with the bore 104, and a somewhat smaller, circular recess 112 is provided in the bottom face of the plate 103, also in axial alinement with the bore 104. A plurality of arcuate recesses 113 are cut in the wall of the recess 112.

As shown in Fig. 15, the spacer sleeve 98 is provided near its lower end with an annular, outwardly-projecting pumping flange 115 which is received within the recess 112 and projects outwardly thereinto. Further, it will be noted from Figs. 10 and 12 that the upper face of the upper bearing 93 engages that portion of the lower face of the plate 103 immediately outward of the wall of the recess 112, whereby the recesses 113 extend radially outwardly beyond the outer periphery of said bearings. This structure permits the circulation of oil-laden gas from the bore of the sleeve 91 under centrifugal impetus from the flange 115 outwardly through the bearings 93 and downwardly through the grooves 96.

The face of the spacer sleeve 98 is spaced from the wall of the bore 104 to form a narrow annulus 116 between the bore, which remains stationary with the plate 103, and the sleeve 98 which revolves with the shaft 76. Further, the plate 103 is provided with small passages 117 extending downwardly into the passages 108 from points on the upper face of the plate spaced outwardly of the recess 111. As will appear more fully hereinafter, gas under pressure is available at the upper ends of the openings 117 and may pass downwardly therethrough into the passages 106 and 108 for supply to the grooves 107 and 105. The supplying of gas under pressure to the groove 105 thus results in the flow of a small stream of gas downwardly through the annulus 116 and outwardly to the recesses 113 and grooves 96.

It is desirable that a substantially friction free sealing means be provided for the rotating portions of the structure, and for this purpose, a set of conventional, labyrinth sealing grooves 118 may be provided on the upper portion of the spaced sleeve 98 for cooperation with the upper portion of the bore 104 above the groove 105. In the alternative, such labyrinth grooves may be provided in the wall of the bore 104, both above and below the groove 105, as shown at 119 and 120, respectively, in Fig. 19. Similarly, for sealing purposes, the underside of the compressor rotor 98 is provided with a downwardly extending shoulder 121 which projects into the recess 111, and which may desirably carry a set of labyrinth sealing grooves 122, as shown in Fig. 15. Again, in the alternative, the labyrinth grooves may be formed in the wall of the recess 111, as shown at 123 in Fig. 19.

For supplying sealing gas to the lower end of the shaft 76, the body 69 is provided with a longitudinal gas passage or bore 124 extending downwardly therein parallel to the bore 75 and alined vertically with one of the passages 108 of the plate 103. At the lower end of the body 69, the passage 124 opens into a chamber 125 alined with an angular passage 126 drilled in the bottom plate 82 and opening into the groove 86. Thus, under the pressure available in the ports 117, gas may flow through the passage 124, through the chamber 125 and the passage 126, and upwardly through the annulus 85.

The spacing of the wall of the first counterbore 88 from the outer wall of the bearing supporting sleeve 91 forms an oil reservoir annulus 127 around the sleeve 91, and lubricating oil is supplied to this annulus from a pipe 128 and through a bore 129 in the flange 70 and body 69. The sleeve 91 is formed with a pair of openings 130 opening into the upper and lower portions of the annulus 127 and receiving lubricant wicks 131. The wicks extend from the annulus through the openings 130 into engagement with the shaft 76 immediately above the lower bearing 78 and immediately below the upper bearing 93. Of course, the wicks remain saturated at all times with lubricating oil and convey the oil to the rapidly revolving surface of the shaft 76. In this manner, a fog of oil particles is created around the shaft 76 and drawn through the upper and lower bearings by the gas flowing action of the lower and upper flanges 86' and 115 of the lower and upper spacer sleeves 79 and 98. Any tendency for the lubricating oil to escape upwardly or downwardly past the spacer sleeves is defeated, however, by the gas flow from the grooves 86 and 105, as described hereinbefore.

Gas is exhausted from the bore 75 through a relatively large gas passage 132 opening into the bore 75 near its lower end and extending upwardly through the body 69 and outwardly through the flange 70 in communication with a gas outlet pipe 133. Gas, containing mechanically entrained lubricating oil, is drawn off through the pipe 133 and conducted to a mist extractor vessel 134 mounted above the expander compressor unit. The vessel 134 contains a mesh-type mist extractor or filter 135 upon which the oil droplets collect for flow by gravity back down through the pipe 133 and passage 132, and onto the bottom plate 82. Of course, the bulk of the lubricating oil being circulated over the bearings of the shaft 76 will likewise flow by gravity to the bottom plate.

Gravity flow of the separated lubricant from the vessel 134 back to the passage 132 is convenient and advantageous, but the lubricant recovered in the vessel 134 may be returned to any point in the lubricating system at which the pressure is sufficiently low.

As shown in Fig. 13, the plate 82 is formed with a lubricating oil sump 136 underlying the lower end of the passage 132. The sump is provided with arcuate legs 137 partially surrounding the shaft 76 and the lower spacer collar 79 and underlying the major portion of the bearing 78. Hence, the lubricating oil is received and accumulated within the sump 136.

A lubricating oil outlet passage 138 extends vertically within the body 69 and opens at its lower end into an oil intake nozzle or dip tube 139 projecting downwardly into the sump 136 to a point near the bottom thereof. At its upper end, the passage 138 communicates with an angular oil outlet passage 140 formed in the flange 70 and having an oil outlet pipe 141 connected into its outer end.

The intermediate pressure gas conductor 51' leading from the low temperature separation vessel 25 is connected into the central portion of the top plate or head 71 of the expander-compressor unit 50, as shown in Fig. 11, and the head 71 is provided with an axial passage 142 leading between the conductor 51' and the intake throat 143 of the compressor rotor 98. The head is also provided in its lower surface with an annular outlet chamber 144 overlying and registering with the outlet chamber 102 of the flange 70 and opening into a vertical passage 145 extending upwardly to the gas outlet conductor 52'. A suction passage 146 leads from a gas suction pipe 147 through the head into the bore 142, and a pressure gas outlet passage 148 leads from the passage 145 through the head to a pressure gas outlet pipe 149.

Gas under pressure is taken through the pipe 149 to an aspirator 150, as shown in Fig. 3, into which the oil outlet pipe 141 is also connected. Thus, the flow of the pressure gas is employed for ejecting of lubricating oil from the sump 136 and discharge of the oil, with the motivating gas from the ejector, through a conductor 151 connected to the inlet 152 of an oil and gas separating vessel 153. The vessel 153 is shown in detail in Fig. 5, and desirably, may be mounted vertically beside the low temperature separation vessel 25, as shown in Figs. 1 and 3. In the usual manner, gas is separated from lubricating oil within the vessel 153, the lubricating oil being returned to the turbine unit through the pipe 128, which is connected into the oil outlet 154 in the bottom of the separator 153, and the separated gas being drawn off from the upper end of the separator through a gas outlet pipe 155 connected through a choke 156 to the gas suction line 147. The mist extractor vessel 134 is also provided with a gas outlet conductor 157 connected to the gas suction pipe 147.

The flow of the lubricating oil is shown schematically in Fig. 8, it being noted that the pressure differential between the compressor discharge to the pipe 52' and the compressor intake from the pipe 51' is utilized for flowing of the lubricating oil as desired. The pressure within the separator 153 will be substantially that of the compressor discharge, less any pressure drop within the ejector or aspirator 150, while the pressure within the annulus 127 will be at a somewhat lower level. This pressure differential is entirely adequate for force feeding the lubricating oil to the annulus and through the wicks 131 to the turbine shaft 76.

As illustrated schematically in Fig. 8, lubricating oil is withdrawn from the sump 136 through the pipe 141 by reason of the ejecting or aspirating effect of the aspirator 150 and conveyed with pressure gas from the pipe 149 through the pipe 151 to the separator 153. The lower portion of the separator 153 may function as an accumulation chamber, or a separate accumulation vessel 158 may be provided as shown for reception of separated oil from the separator 153. Similarly, a conventional oil lubricator 159 may be connected to the vessel 158 for addition of lubricating oil to the system as required, and the oil may be passed through a filter 160 as it flows through the pipe 128 to the annulus 127. The choke 156 maintains the separator 153, and the oil accumulation vessel 158 if such vessel is employed, at a pressure above that of the compressor intake whereby adequate gas pressure for force feeding oil to the turbine bearings is maintained.

Assuming a compressor intake pressure of 600 pounds per square inch and an outlet pressure of 800 pounds per square inch, it follows that the pressure in the chamber 102 will be approximately 850 pounds per square inch and the pressure to the inlet ports 117 will be about 700 to 725 pounds per square inch. Gas at the latter pressure will enter the passages 106 and the groove 105, a portion of the gas flowing upwardly into the space beneath the compressor rotor 98, desirably maintained at about compressor intake pressure by openings 161 formed in the bottom of the rotor, and a portion of the gas will flow downwardly around the spacer sleeve 98. It is this latter flow that prevents the escape of lubricating oil upwardly to the compressor rotor.

Gas will also be conducted downwardly at approximately 700 to 725 pounds per square inch through the passage 124 to the groove 86, from which point some gas will flow downwardly into the interior of the low temperature separation unit operating at 600 pounds per square inch, and some will flow upwardly through the annulus 85. The connection of the mist extractor vessel 134 to the pipe 147 will tend to maintain the mist extractor vessel at approximately 600 pounds per square inch, and through the passage 132, this lower pressure will tend to be communicated to the bore 75. Hence, there is a constant small flow of gas from the passages 117 to the grooves 86 and 105, and inwardly through the annuli 85 and 116 to the bore 75 to prevent the loss of lubricant outwardly through the annuli. Such flow also provides a supply of gas which the flanges 115 and 86′ may constantly flow through the turbine shaft bearings in a circuitous path to convey to the bearings a mist or fog of lubricating oil.

The foregoing pressures are given only as examples, and are in no manner limiting of the invention.

For isolation of the compressor intake from the compressor outlet chamber 144, the compressor rotor 98 is desirably formed with an upstanding neck or collar 162 surrounding the intake throat 143 of the rotor and provided with pressure isolation labyrinth grooves 163. It is also desirable to provide a diffuser ring 164 surrounding the upper portion of the compressor rotor and having diffuser vanes 165 overlying the chamber 102. The labyrinth grooves 163 are spaced closely to the inner periphery of the ring 164 and effectively minimize reverse flow from the chamber 102 to the intake passage 142.

The high pressure gas stream for driving the turbine wheel 80 may be conducted thereto in any suitable or desirable fashion. It is effective, however, to employ the header 46 and to divide the gas stream into unequal portions, two-thirds of the gas stream being taken through the conductor 48, as an example, and one-third of the stream through the conductor 51. The conductor 48 is connected to an inlet gas passage 166 opening inwardly into the flange 70 of the turbine unit 50 and extending downwardly through the body 69 to the plate 82, as shown in Fig. 12. Similarly, the conductor 51 is connected to a passage 167 leading downwardly in the turbine unit to the plate 82 at a point spaced circumferentially from the lower end of the passage 166. A suitable nozzle structure for the plate 82 is shown in Figs. 21 and 22 and includes a rear inlet passage 168, cut in the plate 82 and underlying the lower end of the passage 166. The plate 82 is slotted at 169 for receiving a nozzle forming block 170, shown in Fig. 22, the rearward face 171 of the block 170 forming with the passage 168, a nozzle for the passage 166 opening downwardly through the plate 82 and overlying the blades of the turbine wheel 80. The forward wall 172 of the block 170 cooperates with the shaped forward wall 173 of the slot 169 to provide a somewhat smaller nozzle for the passage 167, also opening downwardly through the plate 82 and overlying the turbine blades.

The volume of flow of the well stream being passed through the apparatus of this invention may vary considerably, and the provision of a large nozzle and a small nozzle, as described hereinabove, permits considerable flexibility in the operation of the turbine unit in accordance with the existent rate of gas flow. Thus, either or both of the nozzle structures may be employed to drive the turbine wheel and the available nozzle flow space thus kept in proportion to the volume of flow of the well stream. Assuming an anticipated maximum flow of ten million cubic feet of gas per day, the rearward nozzle for the passage 166 may be dimensioned for gas flow of the magnitude of five to seven million cubic feet per day, and the smaller nozzle for the passage 167 dimensioned for the handling of gas flows of the magnitude of two to four million cubic feet per day. Turbine nozzles have some latitude of operation, and accordingly, by opening and closing of the valves 49 and 52, or throttling thereof, either or both of the nozzles may be employed and flow rates of the magnitude of from two to two and one-half million cubic feet per day up to ten or eleven million cubic feet per day adequately handled while maintaining a reasonably effective relationship between the rate of gas flow and the dimensioning of the nozzles through which the gas is passing. Manifestly, however, a single nozzle structure may be employed, or any suitable or desirable arrangement of multiple nozzles.

In operation, the well stream, having been denuded of its liquid components in the high pressure separator 37, and having been subjected to regenerative cooling in the heat exchanger 29, enters the turbine structure 50 and flows over the turbine wheel 80 into the interior of the low temperature separator 25. In driving the turbine wheel at turbine speeds of anything from several thousand revolutions per minute to fifteen or twenty thousand revolutions per minute, the well stream is caused to do work, resulting in its effective chilling, and is also caused to undergo a marked pressure reduction, resulting in further chilling due to the Joule-Thompson effect. Because of the availability of the subsequent compression of the effluent gas, the well stream may be dropped in pressure to a somewhat lower level, the cold, denuded, exhaust gas being taken from the conductor 51′, and compressed by the compressor rotor 98 to an intermediate pressure, the effluent gas stream flowing from the turbine unit through the pipe 52′ to a gas transmission pipeline or other point of use. Provision is made for constant circulation of lubricating oil to the shaft of the turbine unit, with continuous gas removal from the lubricating oil and return of the oil to the shaft bearings. Loss of lubricating oil into the low temperature unit or into the compressor section is substantially eliminated by the controlled inward gas flow around the shaft bearing spacer sleeves, followed by recovery of this sealing gas and return thereof to the compressor inlet. Of course, the supply of sealing gas need not come only from the passages 117 since this gas may be drawn off from any point in the system wherein the gas pressure is higher than the suction pressure of the compressor, and conveyed to the grooves 86 and 115 for inward flow through the annuli 86′ and 116.

The foregoing description of the invention is explanatory thereof and various changes in the size, shape and materials, as well as in the details of the illustrated construction may be made, within the scope of the appended claims, without departing from the spirit of the invention.

What we claim and desire to secure by Letters Patent is:

1. In a low temperature separation system in which a fluid stream under high pressure is expanded through a turbine into a separator at a lowered pressure and therein separated into gaseous and liquid phases, and the gaseous phase is withdraw and compressed to a higher pressure by a compressor driven by the turbine, a turbine-compressor having a chamber within which antifriction bearings for the turbine-compressor are positioned, and a lubrication system for the turbine-compressor bearings including a lubricant and gas separator, a lubricant inlet conductor leading from the latter separator to the bearing-containing chamber of the turbine-compressor, an ejector, a lubricant outlet conductor leading from the bearing-containing chamber of the turbine-compressor to the ejector, an ejector gas supply conductor leading from the outlet side of the compressor to the ejector, a gas and lubricant outlet conductor leading from the ejector to the lubricant and gas separator, and a gas return conductor leading from the separator to a point in communication with the inlet side of the compressor.

2. In a low temperature separation system, a lubrication system as set forth in claim 1, and pressure reduction means in the gas return conductor.

3. In a low temperature separation system, a lubrication system as set forth in claim 1, and a lubricant mist eliminator, a gas outlet conductor leading from the bearing-containing chamber of the turbine-compressor to the mist eliminator, and a gas discharge conductor leading from the mist eliminator to a point in communication with the inlet side of the compressor, the gas outlet conductor leading upwardly from the bearing-containing chamber of the turbine-compressor whereby lubricant may return by gravity from the mist eliminator through the gas outlet conductor to the bearing-containing chamber of the turbine-compressor.

4. In a turbine-compressor unit for operation in a gas pressure zone including a housing, a shaft in the housing, turbine and compressor rotors carried on the shaft, and spaced bearings in the housing for the shaft of a type through which gas may flow, a lubrication system for the bearings including, a lubricant conductor in the housing leading to the space between the bearings, gas pump means on the shaft outwardly of each of the bearings, a gas exhaust conductor in the housing communicating with the pump means, the housing having walls closely spaced to the shaft outwardly of the gas pump means to form thin annuli around the shaft outwardly of the pump means, the housing having a conductor leading to each of the annuli from a source of gas under a pressure greater than that inwardly of the annuli for flowing gas from such source inwardly through the annuli toward the bearings to prevent the escape of lubricant through the annuli, and means for withdrawing lubricant from the housing.

5. A turbine-compressor unit for operation in a gas pressure zone including a housing, a shaft in the housing, a lubricating chamber in the housing around the shaft, the housing having walls closely spaced to the shaft at each end of the chamber to form thin annuli around the shaft freely slidable in the housing body at each end of the chamber, spaced bearings in the chamber supporting the shaft, a lubricant conductor leading to the chamber, means for withdrawing lubricant and gas from the housing, means for flowing gas inwardly through the annuli toward the bearings to prevent the escape of lubricant outwardly through the annuli, and compressor and turbine rotors on the shaft outwardly of the annuli.

6. A turbine-compressor unit as set forth in claim 5, and gas pumping means on the shaft between the bearings and the annuli.

7. A turbine-compressor unit as set forth in claim 5, and a sleeve supported in the housing in the lubricating chamber, the outer wall of the sleeve being spaced from the wall of the chamber to define a lubricant reservoir, the lubricant conductor leading to said reservoir, means for conveying lubricant from the reservoir to the shaft to form a lubricant fog around the shaft, and gas pumping means on the shaft outwardly of the bearings for drawing the lubricant fog from the interior of the sleeve outwardly through the bearings.

8. A turbine-compressor unit as set forth in claim 7, wherein the means for conveying lubricant are wicks extending from the lubricant reservoir through the sleeve and into contact with the shaft.

9. A turbine-compressor unit as set forth in claim 5, wherein the gas flowing means includes gas conductors leading from the proximity of the periphery of the compressor rotor to both annuli.

10. A turbine-compressor unit as set forth in claim 9, wherein the walls of the housing forming the annuli have annular grooves, and the gas conductors lead to said grooves.

11. A turbine-compressor unit for operation in a gas pressure zone including, a housing body having an axial bore, a sleeve in the bore, a bearing in the sleeve, a shaft having one end secured in the bearing, means clamping the sleeve and bearing in the bore, a bearing for the opposite end of the shaft freely slidable in the housing body, turbine and compressor rotors on the shaft, a housing cover enclosing with the housing body the compressor rotor, and means for supplying a lubricant to the bearings, the housing body and cover having inlet and outlet fluid flow passages for the turbine and compressor rotors.

12. A turbine-compressor unit for operation in a gas pressure zone including, a housing body having an axial bore and an enlarged counterbore forming an internal shoulder in the axial bore, a sleeve in the bore having an external shoulder engaging the internal shoulder of the axial bore, the sleeve being provided with a bore enlarged at one end to form an internal shoulder therein, a bearing in the bore sleeve engaging the internal shoulder thereof, a shaft having one end secured in the bearing, means clamping the bearing against the internal shoulder of the sleeve bore and through the bearing clamping the sleeve against the internal shoulder of the axial bore, a bearing on the opposite end of the shaft freely slidable in the axial bore, turbine and compressor rotors on the shaft, and a housing cover enclosing with the housing body the compressor rotor, the housing body and cover having inlet and outlet fluid flow passages for the turbine and compressor rotors.

References Cited in the file of this patent

UNITED STATES PATENTS

| | | |
|---|---|---|
| 1,123,588 | Place | Jan. 5, 1915 |
| 1,704,649 | Bowen | Mar. 5, 1929 |
| 2,309,075 | Hill | Jan. 19, 1943 |
| 2,492,672 | Wood | Dec. 27, 1949 |
| 2,635,804 | Jedrzykowski | Apr. 21, 1953 |
| 2,692,081 | Travers | Oct. 19, 1954 |
| 2,703,674 | Wood | Mar. 8, 1955 |
| 2,814,936 | Morrison | Dec. 3, 1957 |
| 2,873,814 | Maher | Feb. 17, 1959 |

UNITED STATES PATENT OFFICE
CERTIFICATION OF CORRECTION

Patent No. 2,937,503                                May 24, 1960

Judson S. Swearingen et al.

It is hereby certified that error appears in the above numbered patent requiring correction and that the said Letters Patent should read as corrected below.

Column 11, line 55, strike out "freely slidable in the housing body".

Signed and sealed this 8th day of August 1961.

(SEAL)
Attest:

ERNEST W. SWIDER
Attesting Officer

DAVID L. LADD
Commissioner of Patents